US012651784B2

(12) United States Patent
Kim

(10) Patent No.: US 12,651,784 B2
(45) Date of Patent: Jun. 9, 2026

(54) LOWER CASE OF BATTERY MODULE HAVING COOLING BLOCK AND MANUFACTURING METHOD THEREOF

(71) Applicant: HYUNDAI MOBIS Co., Ltd., Seoul (KR)

(72) Inventor: Ki Hyeon Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 888 days.

(21) Appl. No.: 17/891,582

(22) Filed: Aug. 19, 2022

(65) Prior Publication Data

US 2023/0055817 A1     Feb. 23, 2023

(30) Foreign Application Priority Data

Aug. 20, 2021    (KR) ........................ 10-2021-0110476

(51) Int. Cl.
| | |
|---|---|
| *H01M 10/6556* | (2014.01) |
| *H01M 10/613* | (2014.01) |
| *H01M 10/6567* | (2014.01) |
| *H01M 50/258* | (2021.01) |

(52) U.S. Cl.
CPC ..... *H01M 10/6556* (2015.04); *H01M 10/613* (2015.04); *H01M 10/6567* (2015.04); *H01M 50/258* (2021.01)

(58) Field of Classification Search
CPC ........... H01M 10/6556; H01M 10/613; H01M 10/6567; H01M 50/258; H01M 2220/20; H01M 10/625; H01M 10/647; H01M 50/209; H01M 50/224; H01M 50/249; H01M 50/262; H01M 50/204; Y02E 60/10
See application file for complete search history.

(56) References Cited

U.S. PATENT DOCUMENTS

| | | | | |
|---|---|---|---|---|
| 2010/0040946 A1* | 2/2010 | Tsuji | .................... | H01M 50/262 |
| | | | | 429/175 |
| 2018/0212214 A1* | 7/2018 | Sakai | .................. | H01M 10/425 |

| | | | | |
|---|---|---|---|---|
| 2020/0067155 A1* | 2/2020 | Hwang | ............... | H01M 10/625 |
| 2022/0352575 A1* | 11/2022 | Kim | ...................... | H01M 50/211 |
| 2022/0376325 A1* | 11/2022 | Chun | .................. | H01M 10/613 |
| 2022/0376327 A1* | 11/2022 | Lee | ................... | H01M 10/6556 |
| 2023/0042629 A1* | 2/2023 | Shin | ................... | H01M 10/613 |
| 2023/0057993 A1* | 2/2023 | Lee | ................... | H01M 10/6557 |
| 2024/0222769 A1* | 7/2024 | Kim | ................... | H01M 50/249 |

FOREIGN PATENT DOCUMENTS

| | | |
|---|---|---|
| CN | 111048867 A | 4/2020 |
| CN | 112952277 A | 6/2021 |
| EP | 2 337 142 A1 | 6/2011 |
| EP | 3 264 494 A1 | 1/2018 |
| KR | 10-2019-0070548 A | 6/2019 |
| KR | 10-2019-0107478 A | 9/2019 |
| KR | 10-2020-0136229 A | 12/2020 |
| KR | 10-2021-0085986 A | 7/2021 |

OTHER PUBLICATIONS

Extended European Search Report issued in corresponding European Application No. 221911225.5 dated Dec. 21, 2022.
Extended European Search Report issued in corresponding European Patent application 22191122.5-1108 dated Dec. 21, 2022.
Office Action issued on Nov. 19, 2025 in Korean Patent Application No. 10-2021-0110476.

* cited by examiner

*Primary Examiner* — Muhammad S Siddiquee

(74) *Attorney, Agent, or Firm* — Morgan, Lewis & Bockius LLP

(57) ABSTRACT

A lower case of a battery module and a method for manufacturing the lower case that can reduce costs by manufacturing a cooling block using a press method, and can further strengthen safety problem due to a leakage of cooling water. There is provided a lower case of a battery module including a lower case in which a battery is mounted, a lower panel assembled to the lower case, a cooling block attached to the lower panel and configured to form a cooling passage between the lower panel and the cooling block, and nipples mounted in the lower case to introduce and withdraw cooling water into and from the cooling passage, and a manufacturing method thereof.

8 Claims, 7 Drawing Sheets

40          43          20

LOWER CASE OF BATTERY MODULE HAVING COOLING BLOCK AND MANUFACTURING METHOD THEREOF

CROSS-REFERENCE TO RELATED APPLICATION

This application claims priority to and the benefit of Korean Patent Application No. 10-2021-0110476, filed on Aug. 20, 2021, the disclosure of which is incorporated herein by reference in its entirety.

BACKGROUND

1. Field of the Disclosure

The present disclosure relates to a lower case in which a battery module is mounted, and more particularly, to a battery module lower case to which a cooling block having a cooling water flow path is attached.

2. Discussion of Related Art

In a conventional water-cooled battery module, a heat sink and a heat sink frame are separately made and combined to manufacture a single battery tray, a battery is disposed between two battery trays manufactured in this way, and then the battery trays are bound with a band clamp.

In order to manufacture a large-capacity water-cooled battery module in this way, since the manufacturing method has to be repeatedly performed for each battery, there is a problem that it is very cumbersome and takes a long time. In addition, since a cooling block is included in the battery module, when cooling water leaks out, the cooling water is introduced into the battery module, which causes a major problem such as a short circuit.

In order to solve the problems, the present inventor has applied for an disclosure related to a lower case for mounting a battery module as shown in FIG. 1 (Korean Patent Application No. 10-2018-0028767 filed on Mar. 12, 2018). FIG. 1 shows a water-cooled battery module according to the above-described disclosure, and FIGS. 2A and 2B show a lower case from which the battery module is separated.

In the water-cooled battery module 100 of the above-described disclosure, at least one battery module 300 is mounted in the lower case 200. The lower case 200 is configured of a lower horizontal plate 220 and side plates 240 that stand vertically on both sides of the lower horizontal plate 220, and has a module mounting space 260 formed therein so that the battery module 300 can be accommodated therein. Cooling passages 222 are formed in the lower horizontal plate 220 at regular intervals to cool the battery module 300 mounted in the module mounting space 260 with a cooling water. That is, the lower case 200, in particular, the lower horizontal plate 220 serves as a water-cooled cooling block for the battery module 300. The cooling passages 222 may be formed at the same time when the lower case 200 is manufactured by an extrusion or casting method.

According to the above-described water-cooled battery module according to the above-described disclosure of the present inventor, above all, since the cooling block, that is, the lower horizontal plate 220 in which the cooling passages 222 are formed is located outside the battery module, it is possible to ensure safety even in the case of a leakage of the cooling water.

SUMMARY OF THE DISCLOSURE

The present inventor proposes a lower case of a battery module, of which costs are reduced by improving a water-cooled battery module of the previous disclosure and manufacturing a cooling block by a press method other than an extrusion or casting method and further strengthening safety problem due to a leakage of cooling water, and a manufacturing method thereof.

According to one feature of the present disclosure for solving the above problems, there are provided a lower case of a battery module including a lower case in which a battery is mounted, a cooling block attached to the lower case and configured to form a cooling passage between the lower case and the cooling block, and nipples mounted in the lower case to introduce and withdraw cooling water into and from the cooling passage, and a manufacturing method thereof.

According to another feature of the present disclosure for solving the above problems, there are provided a lower case of a battery module including a lower case in which a battery is mounted, a lower panel assembled to the lower case, a cooling block attached to the lower panel and configured to form a cooling passage between the lower panel and the cooling block, and nipples mounted in the lower case to introduce and withdraw cooling water into and from the cooling passage, and a manufacturing method thereof.

The above-described configurations and operations of the present disclosure will become more apparent from embodiments described in detail below with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods for achieving them will be made clear from embodiments described in detail below with reference to the accompanying drawings. However, the present disclosure may be embodied in many different forms and should not be construed as being limited to the embodiments set forth herein. Rather, these embodiments are provided so that this disclosure will be thorough and complete and will fully convey the scope of the present disclosure to those of ordinary skill in the technical field to which the present disclosure pertains. The present disclosure is defined by the claims.

Meanwhile, terms used herein are for the purpose of describing the embodiments and are not intended to limit the present disclosure. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Figure 3A:
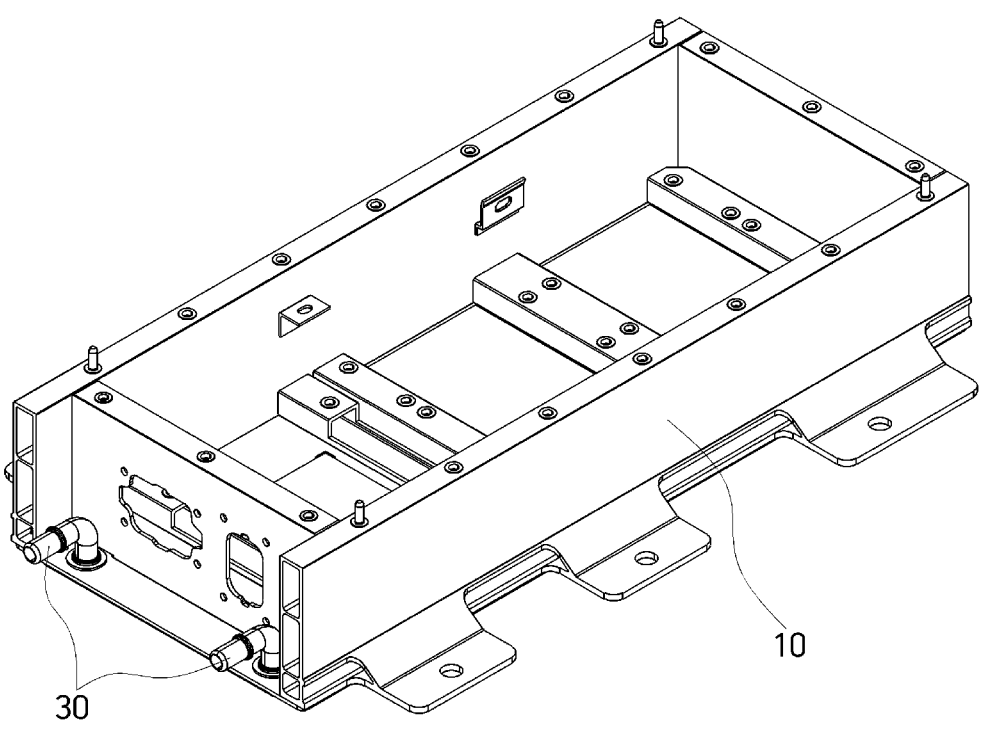
FIG. 3A is an upper perspective view of a lower case of a battery module according to an embodiment of the present disclosure.
Figure 3B:
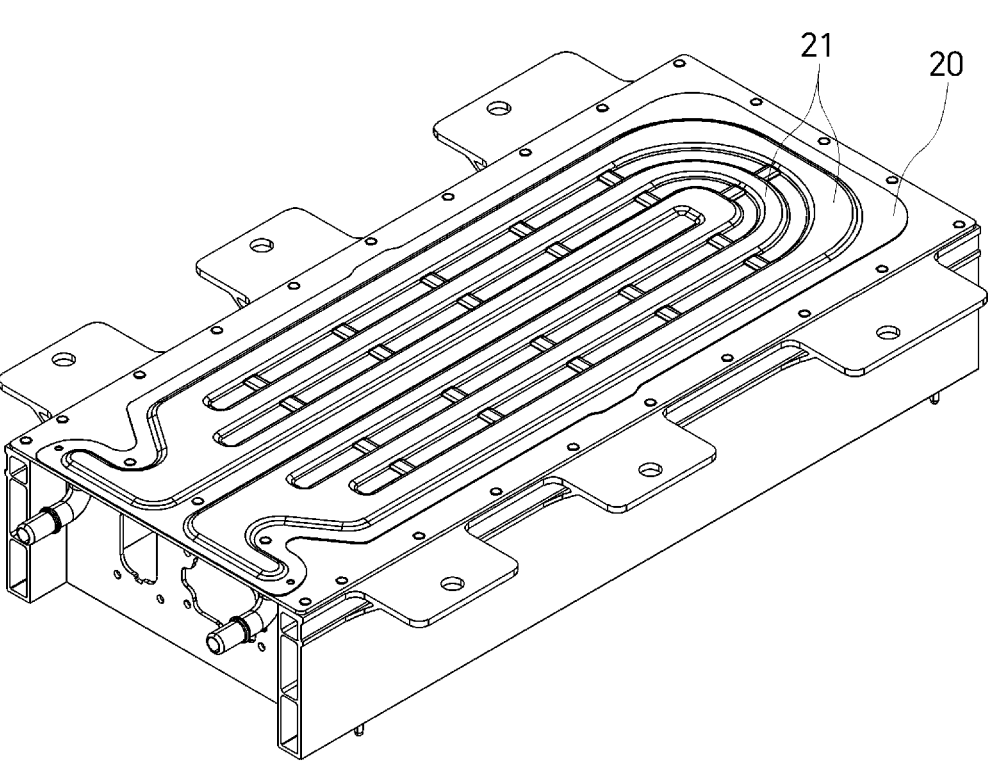
FIG. 3B is a bottom perspective view of the lower case of the battery module.

FIG. 3A is an upper perspective view of a lower case of a battery module according to an embodiment of the present disclosure, and FIG. 3B is a lower perspective view of the lower case.

The lower case 10 is an element for ensuring mechanical robustness of a battery system by mounting components of a battery module assembly (BMA) and a battery system assembly (BSA) in an inner space thereof. Although there are various methods of manufacturing the lower case 10, the lower case 10 is made of an aluminum material or a steel material in the present embodiment.

Figure 1:
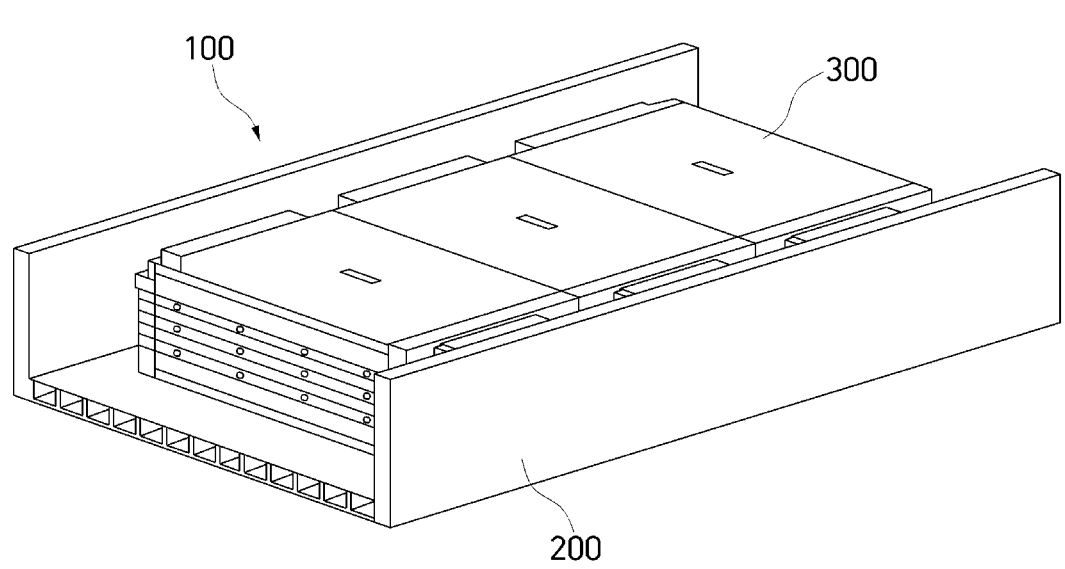
FIG. 1 is a perspective view showing a water-cooled battery module according to a previous disclosure of the inventor.
Figure 2A:
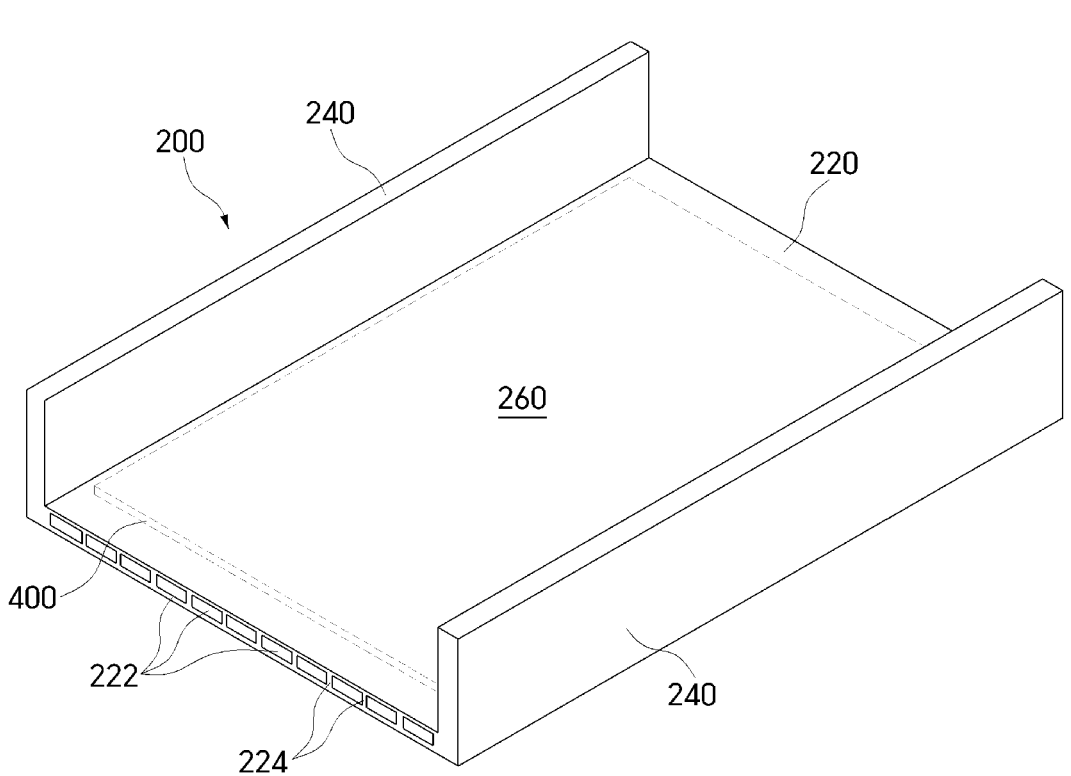
FIGS. 2A and 2B are a perspective view and a cross-sectional view of a lower case constituting the water-cooled battery module of FIG. 1.
Figure 2B:
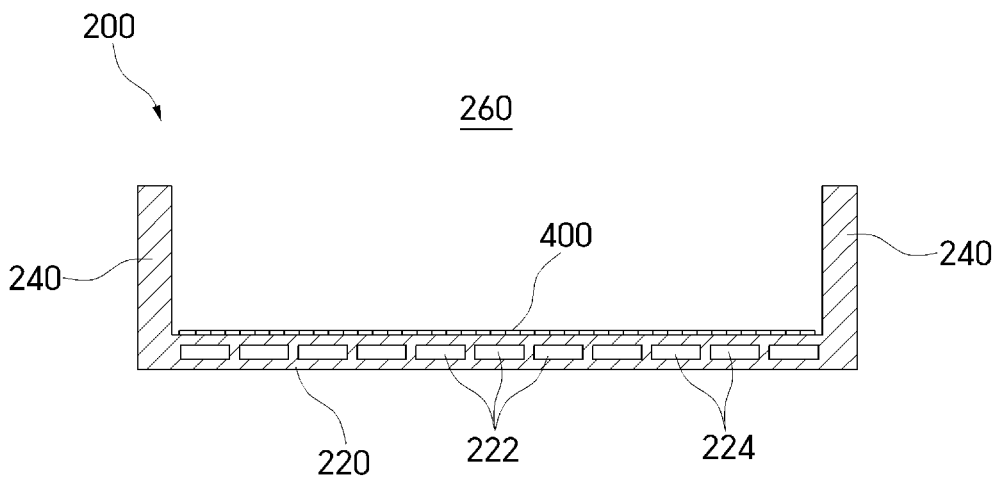

The cooling block 20 is attached to a lower outer surface of the lower case 10. That is, the cooling block 20 is attached to the lower outer surface of the lower case 10 to be isolated from the battery elements (the BMA and BSA components) mounted in the lower case 10. A cooling passage 21 is formed in the cooling block 20 so that cooling water is circulated therethrough. In the present embodiment, the cooling block 20 is manufactured by a press method (in the previous disclosure of the inventor in FIG. 2, the lower case 200 was manufactured by an extrusion or casting method). In order to attach the press-manufactured cooling block 20 to a lower portion of the lower case 10 (precisely to a lower panel 40 which will be described in FIG. 4), brazing welding or a structural adhesive may be used. The cooling block 20 is made of aluminum or steel/plastic by molding. When the cooling block 20 is made of aluminum, it can be attached by brazing welding, and when the cooling block 20 is made of steel/plastic by molding, it can be attached with a structural adhesive.

Nipples 30 are for an inlet and an outlet for introducing and withdrawing the cooling water into and from the cooling passage 21 of the cooling block 20 attached to the lower portion of the lower case 10 and may be attached to the lower case 10 by brazing welding or a structural adhesive in the same manner as the cooling block 20. In relation to ensuring safety of the battery system which is one of main objects of the present disclosure, unlike the conventional battery system in which the nipples are included in the lower case, in the present disclosure, the nipples 30 are mounted outside the lower case 10, that is, at a position isolated from the battery system to suppress degradation in safety of the battery system due to a leakage in a nipple connection part or a pipe.

Figure 4:
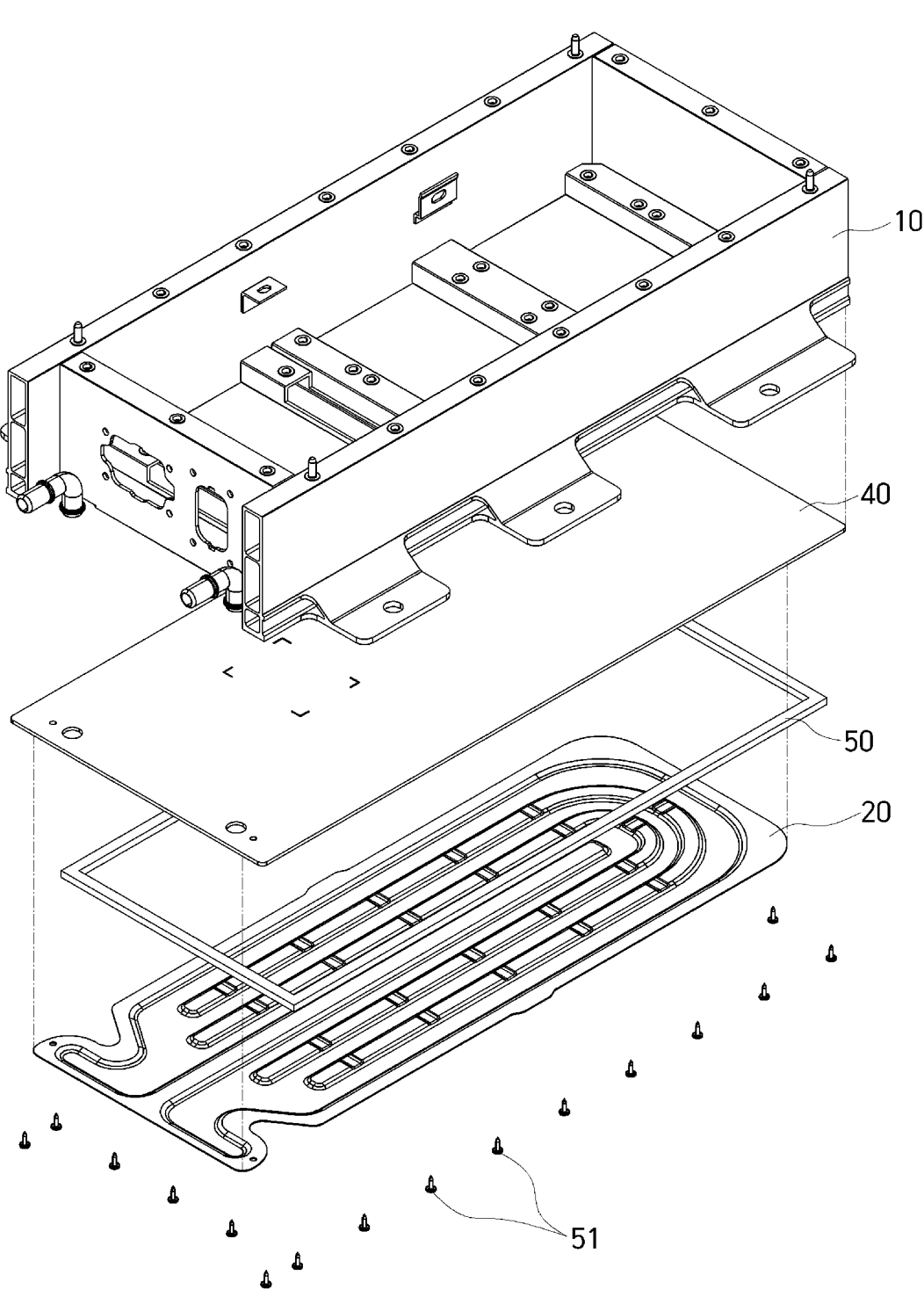
FIG. 4 is an exploded view showing the overall structure of the lower case of the battery module.

FIG. 4 shows the overall structure of the lower case of the battery module according to the embodiment of the present disclosure.

The lower panel 40 is assembled to the lower outer surface of the lower case 10, and the cooling block 20 is attached to a lower portion of the lower panel 40. In this way, the safety of the battery module may be ensured by placing the cooling block 20 to be isolated from the BMA and BSA components in the lower case 10 and thus solving the existing problems caused by the cooling water flowing into the battery when the cooling water leaks due to pressure or collision.

The lower panel 40 is a component according to one embodiment and may be omitted according to another embodiment. That is, the cooling block 20 may be directly attached to the lower surface of the lower case 10. In the following description, although it is assumed that the lower panel 40 is present, attaching the cooling block 20 directly to the lower case 10 in a state in which the lower panel 40 is omitted can be easily performed through the following description.

The nipples 30 are mounted on a lower portion of a side wall 11 of the lower case 10, and a cooling water passage hole 41 is formed in the lower panel 40 at the same position as the position of the nipple 30. Therefore, when the lower panel 40 is assembled at the lower portion of the lower case 10, the nipple 30 and the cooling water passage hole 41 coincide with each other (a sealer may be used for water-tightness).

In order to assemble the lower panel 40 to the lower case 10, a liner plate 50 and a RIVTAC® 51 were used in the present embodiment. That is, the lower panel 40 is placed on the lower portion of the lower case 10, the liner plate 50 is provided, and then the RIVTAC® 51 is fastened to fix an edge of the lower panel 40 to a lower edge of the lower case 10. However, other fastening methods are possible. For example, the lower panel 40 may be attached to the lower portion of the lower case 10 using a friction stir welding (FSW)/metal inert gas (MIG) welding method.

The cooling block 20 attached to the lower panel 40 may be attached to the lower panel 40 by brazing welding when the cooling block 20 is made of an aluminum material as described above and may be attached with a structural adhesive when the cooling block 20 is made of steel/plastic by molding.

In the case of the lower case manufactured with such a structure by the conventional extrusion or casting method, the lower case itself has to be replaced when the cooling system is damaged, but according to the present disclosure, when the cooling block 20 is damaged, only the cooling block 20 needs to be replaced, and the lower case 10 can be reused.

The cooling block 20 may be manufactured by a press method. That is, a recess (or an embossing) may be press-processed in the shape of the cooling passage 21 on a plate base material using a press mold. Here, the recess is expressed from the viewpoint of looking at the cooling block 20 from the position of the lower panel 40, and the emboss-ing is expressed from the viewpoint of looking at a bottom surface of the cooling block 20. The recess (or embossing) forms the cooling passage 21 together with the surface of the lower panel 40 by attaching the cooling block 20 to the lower panel 40.

As described above, since the recess (or the embossing) for forming the outside of the cooling block 20 and the cooling passage is manufactured by the pressing method, the manufacturing process can be simplified and the manufac-turing cost can be reduced.

Figure 5A:
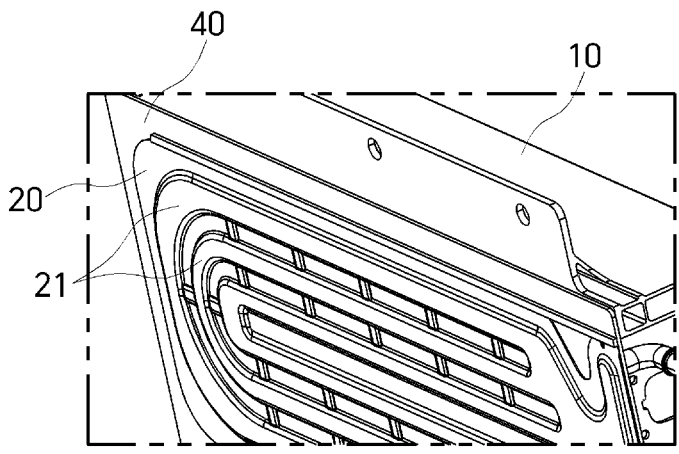
FIG. 5A is a perspective view of a cooling block (20) when seen from a bottom surface of a lower case (10)
Figure 5B:
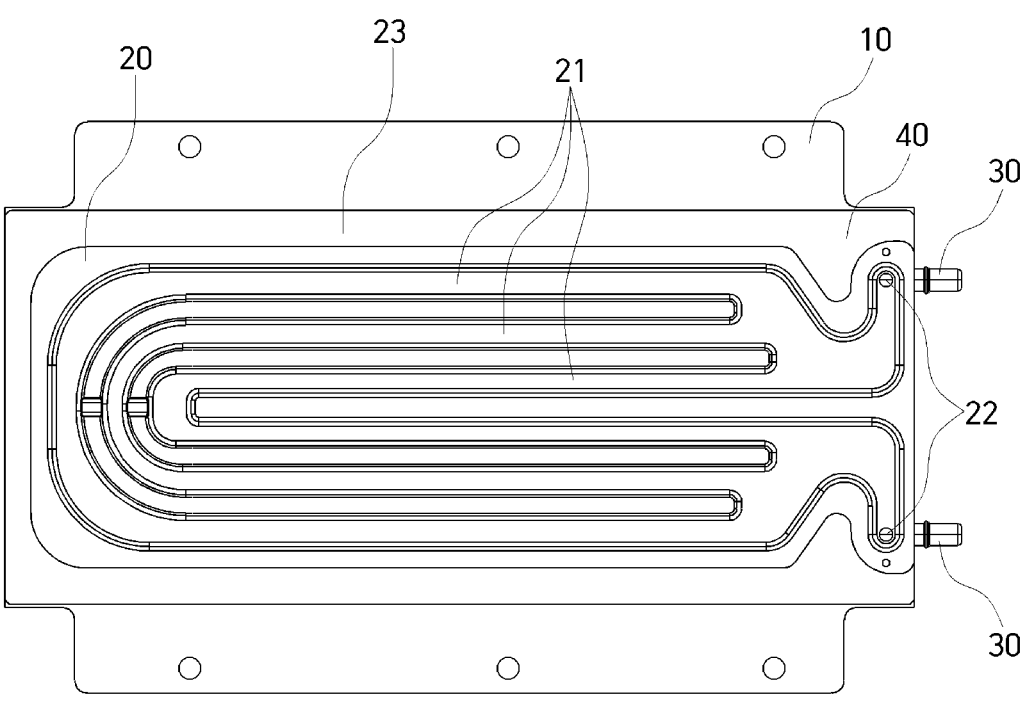
FIG. 5B is a bottom view of the lower case (10)
Figures 5C, 6A:
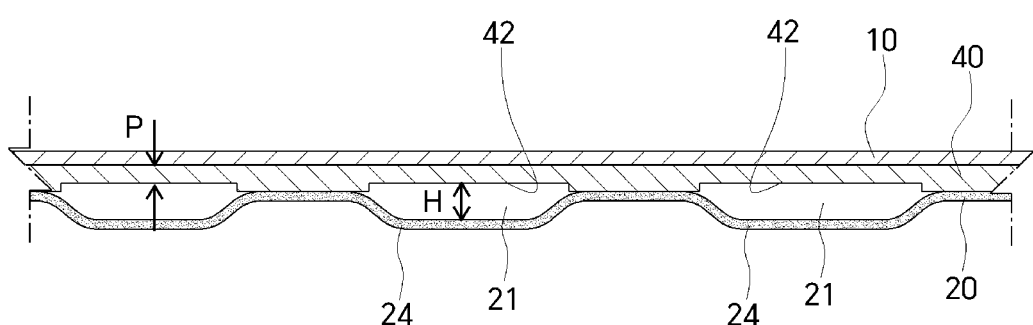
FIG. 5C is a cross-sectional view of the cooling block (20), which is taken a line passing a cooling passage (21) in a state in which the cooling block (20) is attached to a lower panel (40)
FIG. 6A is an explanatory view of an assembly method of the cooling block (20) when seen from the bottom surface of the lower case (10)

FIG. 5A is a perspective view of the cooling block 20 when seen from the bottom surface of the lower case 10, FIG. 5B is a plan view of the cooling block 20 (that is, a bottom view of the lower case 10), and FIG. 5C is a cross-sectional view of the cooling block 20, which is taken a line passing the cooling passage 21 in a state in which the cooling block 20 is attached to the lower panel 40.

It can be seen from FIG. 5A that the cooling passage 21 which protrudes from the bottom surface of the cooling block 20 is embossed by a press.

Additionally, in FIG. 5B, it can be seen that the cooling water inlet and outlet 22 which communicate with the nipples 30 are formed in the cooling passage 21. In addition, it can be seen that an outer line 23 of the cooling block 20 is pressed into a small area to be located within an outer line of the lower panel 40. Therefore, even when an attachment state between the lower panel 40 and the cooling block 20 is destroyed and the cooling water leaks out, a possibility that the cooling water escapes to the outside without flowing on a side surface of the lower case 10 and penetrating into the inner space is further increased.

Additionally, in the cross-sectional view of FIG. 5C, it can be seen that the recess 24 concavely formed by pressing into the lower portion of the cooling block 20 forms a space between the lower panel 40 and the cooling block 20 and thus forms the cooling passage 21. However, in this structure, cooling performance may be somewhat reduced by welding for attaching the lower panel 40 to the lower case 10 and the need to ensure a thickness for securing rigidity. In order to solve such problems and to maintain the cooling performance, a carving 42 having a shape that is identical or similar to a passage shape is formed in a portion of the lower panel 40 that forms the cooling passage 21 with the recess 24 of the cooling block 20. The carving 42 formed in the lower panel 40 increases a height H of the cooling passage 21 to reduce a differential pressure during circulation of the cooling water and reduces a heat transfer path P from the cooling passage 21 to the battery through the lower panel 40 to increase the cooling performance.

The ease of assembly of the cooling block 20 and the structure for preventing separation after assembly will be described.

Figure 6B:
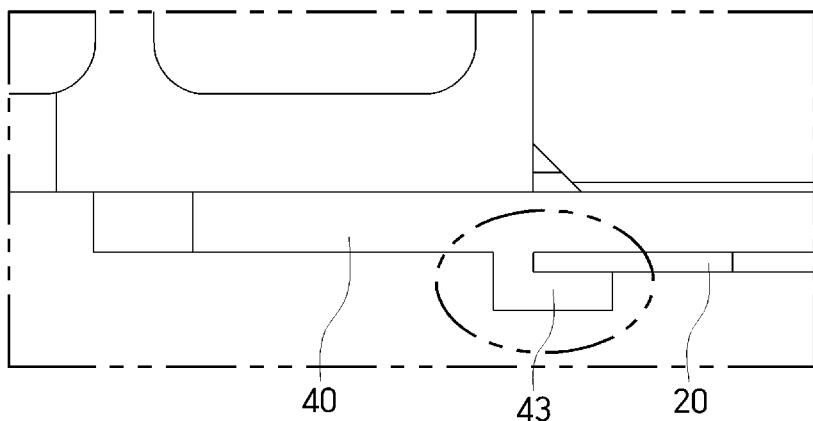
FIG. 6B is a partial cross-sectional view of the cooling block (20) assembled as shown in FIG. 6A.

Referring to FIG. 6A, a pair of slide guides 43 are mounted on the lower panel 40 assembled on the lower case 10, and the cooling block 20 is fitted into a space between the guides 43 from the side and is then slidingly inserted. After insertion, the cooling block 20 is attached to the lower panel 40 using brazing welding or a structural adhesive as described above. FIG. 6B is a cross-sectional view of the cooling block 20 fitted to the slide guide 43.

Due to the application of such a sliding structure, an assembly position of the cooling block 20 can be restricted, the assembly property is improved by facilitating the assembly, and the separation due to excessive pressure can be prevented after assembly, thereby obtaining an effect of structural strengthening.

According to the present disclosure, the following effects can be obtained.

It is possible to reduce a thermal resistance element between a cell (a battery) to be cooled and cooling water so that cooling efficiency is increased by integrating a cooling block and cooling-related parts with a lower case.

In terms of unsafety that is the biggest problem of water-cooled batteries, the safety of the battery can be improved by placing the cooling block outside the case and thus blocking a possibility that the cooling water enters the case and causes a short (a short circuit) and fire when the cooling water leaks from the cooling block side.

Since the cooling block is manufactured by a press method and can be easily assembled in the lower case, the process related to press-fitting or casting is eliminated, and cost can be reduced.

Since the cooling block manufactured by the press method can be easily removed from the lower case, when the cooling block is damaged, the lower case itself can be left, and only the cooling block can be replaced.

Although the present disclosure has been described in detail above with reference to exemplary embodiments, those of ordinary skill in the technical field to which the present disclosure pertains should be able to understand that various modifications and alterations can be made without departing from the technical spirit or essential features of the present disclosure. Therefore, it should be understood that the disclosed embodiments are not limiting but illustrative in all aspects. The scope of the present disclosure is defined not by the above description but by the following claims, and it should be understood that all changes or modifications derived from the scope and equivalents of the claims fall within the scope of the present disclosure.

What is claimed is:

1. A lower case of a battery module, comprising:
a lower case in which a battery is mounted;
a cooling block attached to the lower case and configured to define a cooling passage extending between the lower case and the cooling block; and
nipples mounted in the lower case to introduce and withdraw cooling water into and from the cooling passage,
wherein the cooling passage is defined by a groove formed upwardly in the lower case and a recess formed downwardly in the cooling block.

2. The lower case of the battery module of claim 1, wherein the cooling block is braze-welded or adhesive-bonded to the lower case.

3. The lower case of the battery module of claim 1, wherein an outer line of the cooling block is located within an outer line of the lower case.

4. The lower case of the battery module of claim 1, wherein the lower case includes a slide guide configured to restrict an attachment position when the cooling block is attached to the lower case.

5. The lower case of the battery module of claim 1, wherein the cooling block is manufactured by a press method.

6. The lower case of the battery module of claim 1, wherein a material of the cooling block is one of aluminum, steel, or plastic.

7. A lower case of a battery module, comprising:
a lower case in which a battery is mounted;
a cooling block attached to the lower case and configured to define a cooling passage extending between the lower case and the cooling block;
nipples mounted in the lower case to introduce and withdraw cooling water into and from the cooling passage; and
a lower panel assembled between the lower case and the cooling block,
wherein the cooling block is configured to form the cooling passage between the lower panel and the cooling block,
wherein the cooling passage is defined by a groove formed upwardly in the lower panel and a recess formed downwardly in the cooling block.

8. The lower case of the battery module of claim 7, wherein the lower panel includes a slide guide configured to restrict an attachment position when the cooling block is attached to the lower panel.

\* \* \* \* \*